United States Patent
Skolozdra et al.

(10) Patent No.: US 9,557,509 B2
(45) Date of Patent: Jan. 31, 2017

(54) FIBER OPTIC CABLE EXTERNAL SHIELD CONNECTOR

(71) Applicant: Electric Motion Company, Inc., Winsted, CT (US)

(72) Inventors: Stephen A. Skolozdra, Terryville, CT (US); William J. Balfour, Jr., Winsted, CT (US); John K. Carrozzo, Torrington, CT (US)

(73) Assignee: Electric Motion Company, Inc., Winsted, CT (US)

( * ) Notice: Subject to any disclaimer, the term of this patent is extended or adjusted under 35 U.S.C. 154(b) by 0 days.

(21) Appl. No.: 15/054,259

(22) Filed: Feb. 26, 2016

(65) Prior Publication Data

US 2016/0252697 A1    Sep. 1, 2016

Related U.S. Application Data

(60) Provisional application No. 62/121,590, filed on Feb. 27, 2015.

(51) Int. Cl.
*G02B 6/44* (2006.01)

(52) U.S. Cl.
CPC ........... *G02B 6/4471* (2013.01); *G02B 6/4435* (2013.01)

(58) Field of Classification Search
CPC ............................. G02B 6/4471; G02B 6/4435
See application file for complete search history.

(56) References Cited

U.S. PATENT DOCUMENTS

| | | | |
|---|---|---|---|
| 5,597,314 A * | 1/1997 | Auclair | H01R 4/363 439/793 |
| 6,340,250 B1 * | 1/2002 | Auclair | G02B 6/4477 385/87 |
| 6,591,055 B1 * | 7/2003 | Eslambolchi | G02B 6/2558 385/136 |
| 8,317,526 B2 * | 11/2012 | Gardner | H01R 4/36 24/489 |
| 2002/0176674 A1 | 11/2002 | Auclair | |
| 2006/0283619 A1 * | 12/2006 | Kowalczyk | G02B 6/4471 174/78 |

FOREIGN PATENT DOCUMENTS

| | | |
|---|---|---|
| AU | 2007201817 | 12/2007 |
| KR | 1020110102013 | 9/2011 |

OTHER PUBLICATIONS

Search Report and Written Opinion, Jun. 3, 2016.

* cited by examiner

*Primary Examiner* — Ryan Lepisto
(74) *Attorney, Agent, or Firm* — Alix, Yale & Ristas, LLP

(57) ABSTRACT

A fiber optic external shield connector for grounding a fiber optic cable. The external shield connector is irreversibly mounted to the fiber optic cable using traditional tools. Prongs on the inside of the shield connector puncture the outer non-conductive sheath of the fiber optic cable. The external shield connector is compatible with fiber optics cables having different diameters. The prongs are arranged to complement the geometry of the fiber optic cables for the specific application. The prongs contact an inner conductive sheath of the cable and connect the conductive sheath electrically to an outside ground. This engagement does not expose the internal portions of the fiber optic cable to outside elements such as moisture.

17 Claims, 6 Drawing Sheets

FIBER OPTIC CABLE EXTERNAL SHIELD CONNECTOR

BACKGROUND

This disclosure relates generally to an external shield connector used to connect fiber optic cables to an external ground. More particularly, this disclosure relates to connectors and grounding techniques which penetrate the outer non-conductive sheaths of fiber optic cables.

Fiber optic cables typically have an outer non-conductive sheath that protects the fiber optics contained within the cable from outside elements such as moisture. Typically, this outer non-conductive sheath is stripped using specific tools to create an opening to the interior of the cable for grounding an inner conductive shield to an outside ground.

SUMMARY

Briefly stated, a fiber optic cable shield connector comprises a cable clamp and a grounding base. The cable clamp has a longitudinal quasi-convergent groove to receive a cable and two longitudinal tabs extending from opposite edges along the groove.

The grounding base has a first surface and a cradle extending from the first surface to a second surface. Two longitudinal slots extend through the grounding base to accommodate the tabs. A laterally spaced retaining clip at each end of each slot irreversibly mates with teeth on the tabs. Conductive prongs extend from the cradle in the direction of the second surface and engage a grounding assembly that penetrates the grounding base in the longitudinal direction between the first and second surfaces.

The cable clamp and grounding base are installed on fiber optic cables by traditional means (i.e. channel lock pliers). When compressed together around a fiber optic cable, the prongs penetrate the outer non-conductive sheath of the fiber optic cable and provide a grounding path from an inner conductive sheath to an outside ground. The cable shield connector requires no special tools for installation and has a small profile upon installation on a fiber optic cable.

DETAILED DESCRIPTION

Figure 4:
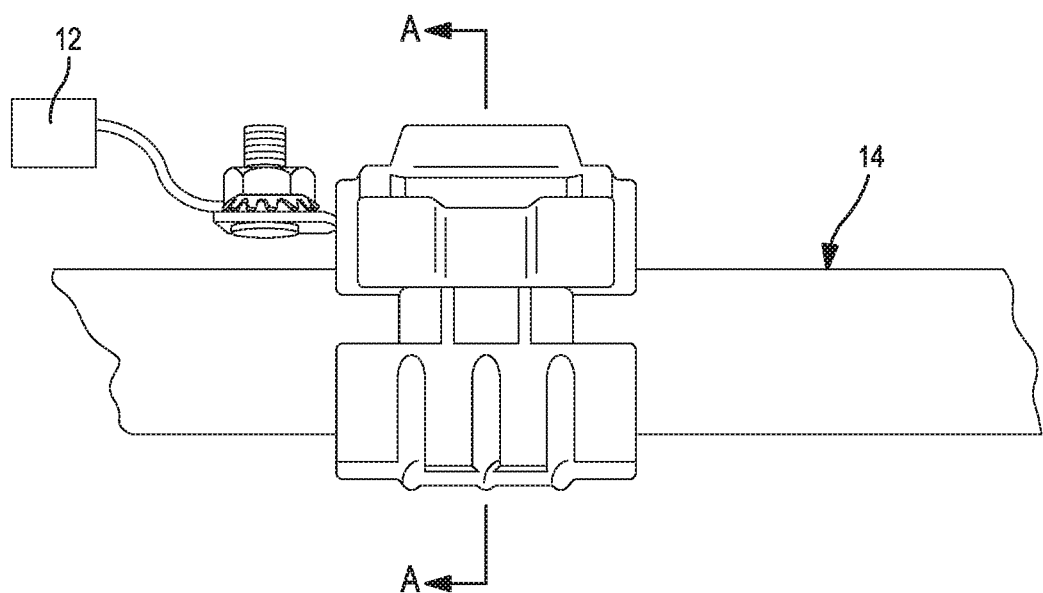
FIG. 4 is a side view of the external shield connector of FIG. 1 installed on a fiber optic cable.

With reference to the drawings wherein like numerals represent like parts throughout the several Figures, an external shield connector is generally designated by the numeral 10. The external shield connector 10 is employed to connect with a ground 12 (depicted in FIG. 4) for grounding a fiber optic cable 14 (depicted in FIGS. 4-6). The external shield connector 10 is designed to ground the fiber optic cable 14 without exposing the internal portion of the cable to external elements, such as moisture, in a highly efficient installation method.

Figure 5:
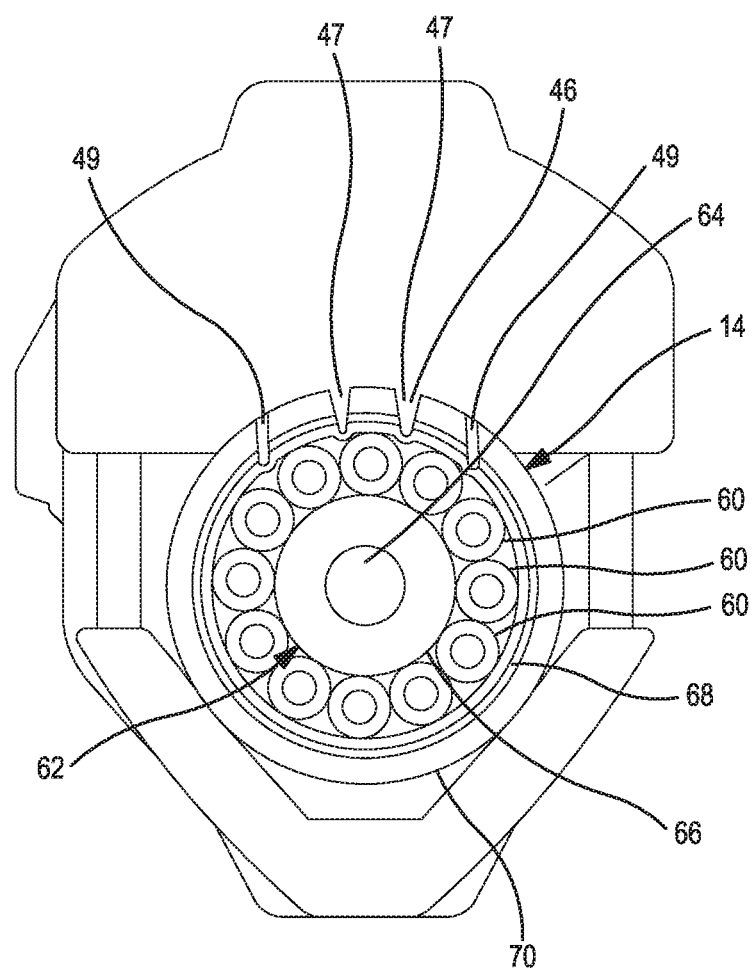
FIG. 5 is a cross-sectional view along line A-A of FIG. 4 of the cable and the external shield connector of FIG. 4.
Figure 6:
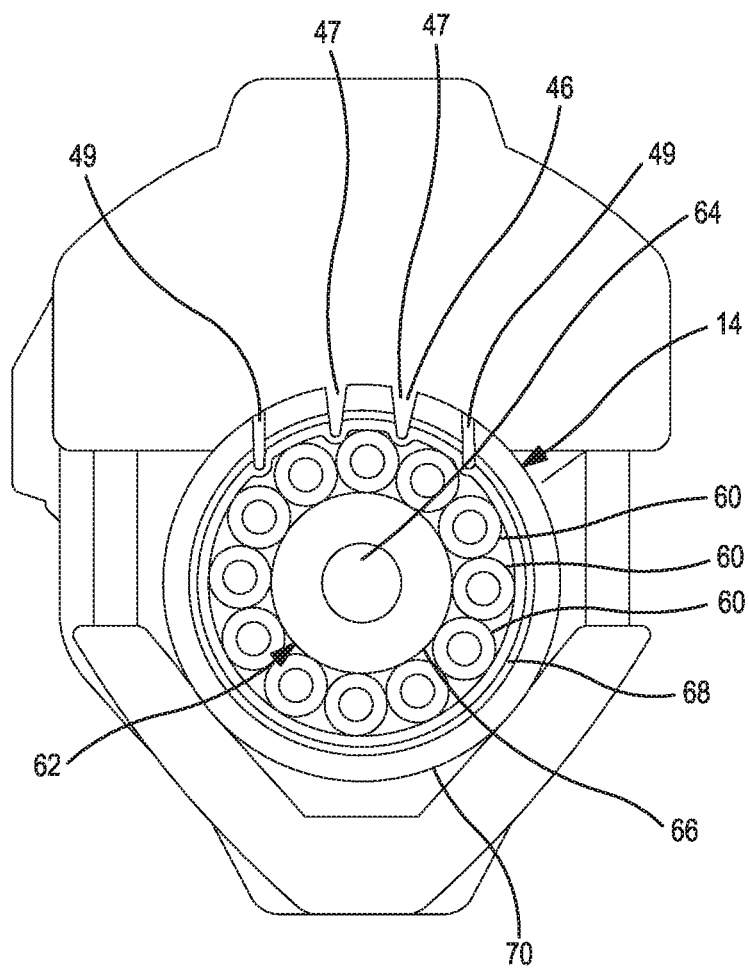
FIG. 6 is a cross-sectional view similar to that along line A-A of FIG. 4 of the cable and a modified embodiment of the external shield connector of FIG. 4.

In the example herein selected for illustrative purposes, a fiber optic cable 14 is illustrated in FIGS. 5 and 6 as including a plurality of optic fibers 60 with a center support wire 62. In the depicted embodiment, the center support wire 62 is made of a non-conductive rigid center 64 (i.e. KEVLAR® material) surrounded by an inner non-conductive sheath 66. The inner non-conductive sheath 66 is surrounded by the optic fibers 60. A corrugated conductive sheath 68 surrounds the optic fibers 60 and is surrounded by an outer non-conductive sheath 70.

Figure 1:
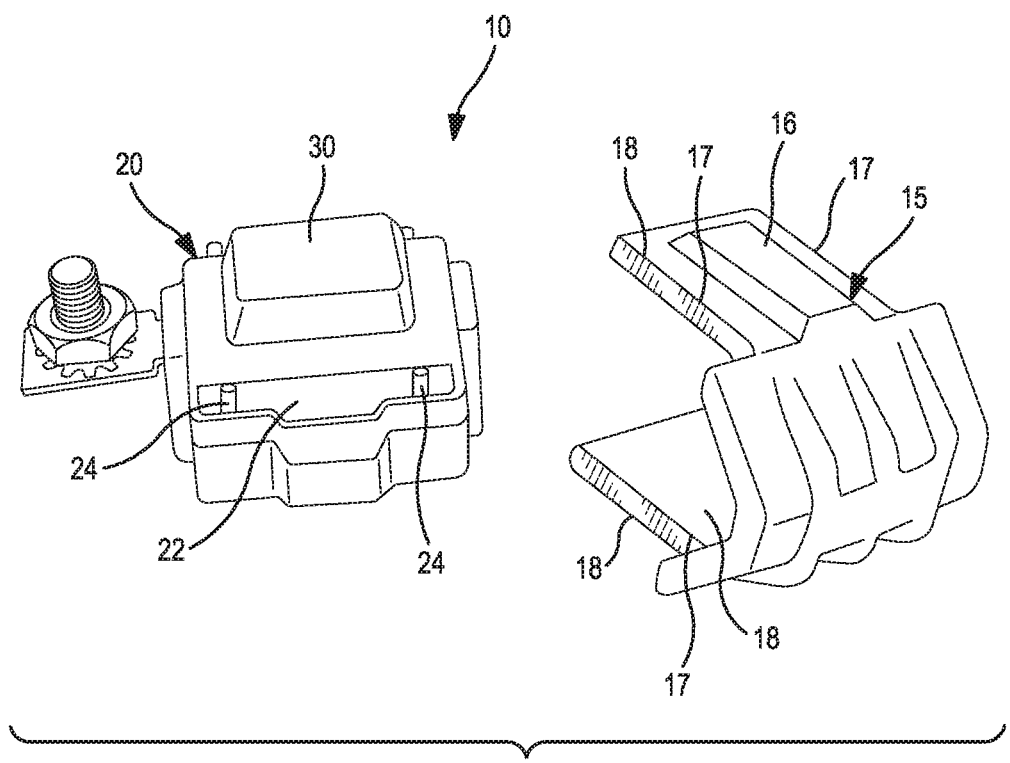
FIG. 1 is a perspective view of an external shield connector prior to installation.
Figure 2:
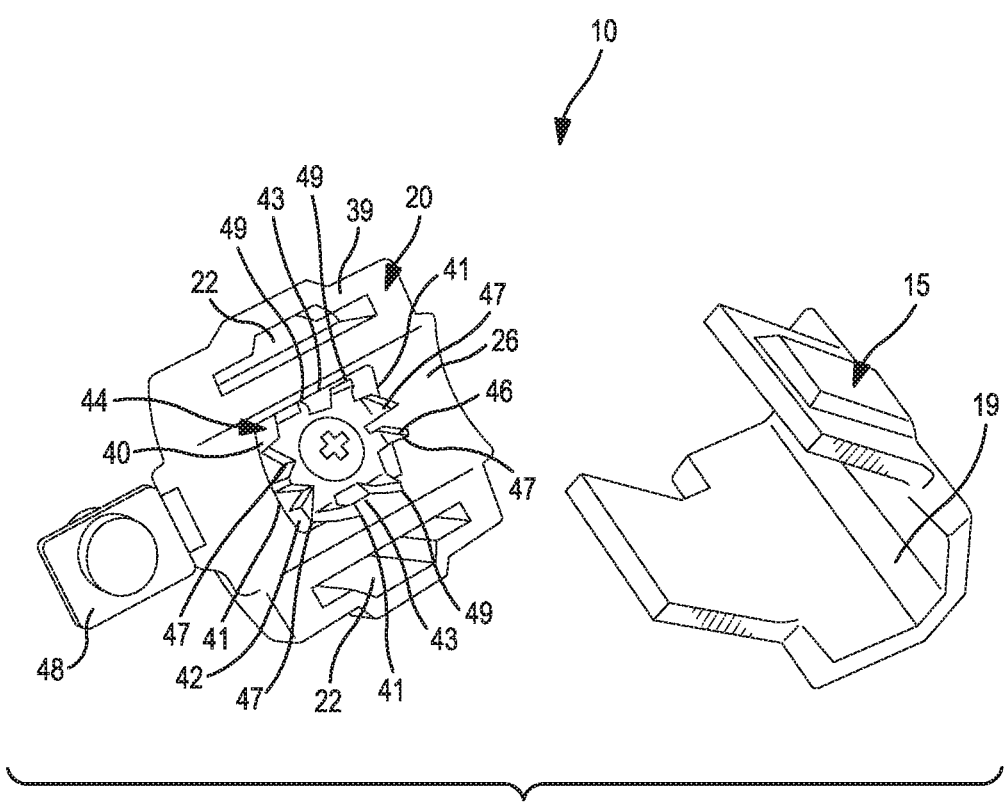
FIG. 2 is an alternate perspective view of the external shield connector of FIG. 1 prior to installation.

Referring to FIGS. 1 and 2, the external shield connector 10 comprises a U-shaped cable clamp 15 and a box-like grounding base 20. In one embodiment, both the cable clamp 15 and the grounding base 20 are made of dielectric plastic, but other nonconductive materials may also be employed.

Figure 3:
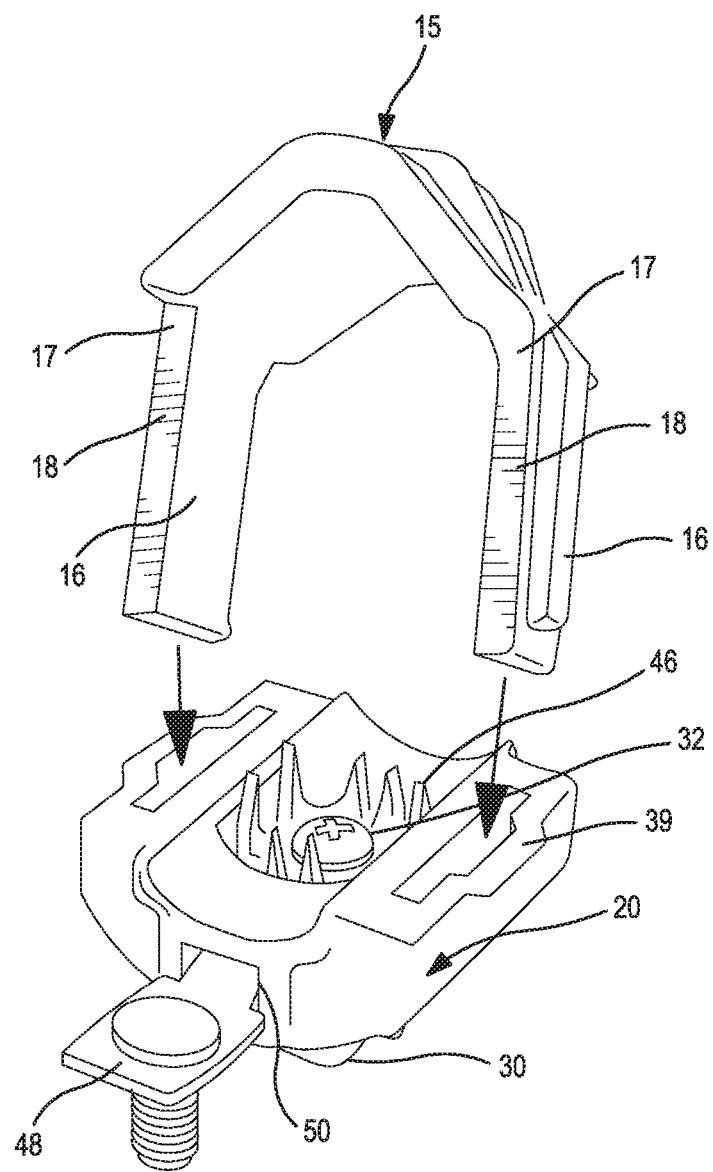
FIG. 3 is a diagrammatic perspective view of the connection between the cable clamp and grounding base of the external shield connector of FIG. 1.

The grounding base 20 contains a cradle 40 that extends from a first surface 30 to a second surface 39. Arcuate groove 26 surrounds the cradle 40 in at least the longitudinal direction on the second surface 39. Prongs 46 are arranged in cradle 40 and project away from the first surface 30 in the direction of the second surface 39. Longitudinal slots 22 are arranged along the edges of the grounding base 20 from the first to second surface 30, 39. Integral retention clips 24 are disposed within opposite longitudinal ends of each slot 22. Referring to FIG. 3, the grounding base 20 contains grounding slot 50 in the longitudinal direction between the first and second surfaces 30, 39 to accommodate stud assembly 48. Prongs 46 are mounted in contact with stud assembly 48 by appropriate fastening means (i.e. screw) 52. This configuration provides a grounding path from prongs 46 to stud assembly 48 through grounding slot 50 and ultimately to an external ground 12 (depicted in FIG. 4).

In the embodiment depicted in FIG. 2, a rubber pad 42 is disposed in cradle 40, which provides insulation and flexibility between grounding base 20 and conductive assembly 44. Conductive assembly 44 comprises prongs 46 and stud assembly 48. In the depicted embodiment, prongs 46 are arranged in an array of laterally and longitudinally spaced prongs. Two pairs of lateral prongs 47 are arranged along the lateral edges 41 of cradle 40. Two pairs of longitudinal prongs 49 are arranged along the longitudinal edges 43 of cradle 40. In one embodiment, the lateral and longitudinal prongs 47, 49 are formed by bending a single piece of copper sheet metal, or similar material, with sharpened protrusions around the edges along opposing lateral and longitudinal edges. In the embodiments depicted in FIGS. 5 and 6, the longitudinal prongs 49 extend a further distance from the cradle 40 than that of lateral prongs 47. This results in a contact pattern of the prongs 46 that is quasi-complementary to the fiber optic cable 14. In one embodiment, the prongs 46 are spaced to complement the specific fiber optic cable 14.

Referring to FIG. 1, the cable clamp 15 contains two laterally opposed longitudinal tabs 16 that align with slots 22 of the grounding base 20. The tabs 16 have teeth 18 along edges 17. In the embodiment depicted in FIG. 1, the cable clamp 15 has longitudinal cable groove 19 that accommodates cables of different diameters. Depending on the application, cable groove 19 may have different widths that each accommodate a range of cable sizes.

The external shield connector 10 is installed on a fiber optic cable 14 by placing the grounding base 20 and the cable clamp 15 on opposite sides of the cable 14. Forcing tabs 16 into slots 22 (as depicted in FIG. 3) using standard tools (i.e. channel lock pliers) crimps the cable clamp 15 to the grounding base 20 around the fiber optic cable 14. The retention clips 24 cooperatively engage teeth 18 on corresponding edges 17 of each tab 16 to irreversibly mate the cable clamp 15 to the grounding base 20.

In the embodiment depicted in FIG. 5, the prongs 46 puncture outer non-conductive sheath 70 and contact corrugated conductive sheath 68. The puncture of the outer non-conductive sheath 70 is protected from outside elements by limiting the engagement to within the cradle 40. Cradle 40 is sized such that contact between the edges of the cradle 40 and the fiber optic cable 14 (not depicted) effectively seals the punctures from outside elements. In one embodiment, water-blocking gel is installed on the tips of prongs 46 to further protect against cable permeation by outside elements such as moisture.

In one embodiment, grooves 19, 26 accommodate fiber optic cables having a diameter of approximately 0.48 inches to 0.78 inches. When installed on fiber optic cable 14, the cooperation of the clamp 15 and the cable groove 19 urges the prongs 46 of the grounding base 20 to engage into the cable. In one embodiment, the cable groove 19 is not entirely complementary in shape to a typical fiber optic cable; cable groove 19 is quasi-convergent and adapted to provide a force on the received cable regardless of diameter. This allows cables having a variety of diameters to be compatible with a single cable clamp 15 and prevents bottoming out of the connection to avoid damaging the fiber optic cable 14.

FIG. 6 depicts an alternate embodiment of external shield connector 10 where the prongs 46 slightly deform the corrugated conductive sheath 68. In some applications this interface is desirable to further protect the interior of the fiber optic cable 14 from environmental elements.

While preferred embodiments of the foregoing have been set forth for purposes of illustration, the foregoing description should not be deemed a limitation of the invention herein. Accordingly, various modifications, adaptations and alternatives may occur to one skilled in the art without departing from the spirit and the scope of the present invention.

The invention claimed is:

1. An optical wire grounding assembly, comprising:
   a cable clamp defining a longitudinal groove for a cable and two laterally spaced tabs, said tabs having opposite longitudinally spaced edges and having teeth disposed on said edges;
   a grounding base having a first surface, a cradle extending from said first surface to a second surface, two laterally spaced slots extending from said first surface to said second surface to accommodate said tabs, a retention clip at a longitudinal end of each slot, and a grounding slot extending in a longitudinal direction from said cradle to an outer longitudinal end of said grounding base between said first and second surfaces;
   an electrically conductive assembly mounted in said cradle comprising prongs extending away from said first surface toward said second surface and a stud assembly conductively communicating with said prongs and extending through said grounding slot to an external ground; and
   an optical cable having a corrugated conductive shield surrounded by an outer non-conductive sheath;
   wherein said cable clamp and said grounding base are fixed to each other on said optical wire by said teeth irreversibly engaging said retaining clips, and said prongs puncture said outer non-conductive sheath and contact said corrugated conductive shield.

2. The optical wire assembly of claim 1, wherein said prongs comprise an array of two pairs of lateral prongs and two pairs of longitudinal prongs.

3. The optical wire assembly of claim 2, wherein said longitudinal prongs extend a greater distance than said lateral prongs from said first surface.

4. The optical wire assembly of claim 2, wherein said longitudinal prongs are spaced further apart than said lateral prongs.

5. The optical wire assembly of claim 1, wherein said prongs deform said corrugated conductive sheath.

6. The optical wire assembly of claim 1, further comprising a rubber pad disposed between said conductive assembly and said grounding base.

7. The optical wire assembly of claim 1, wherein said prongs are mounted to said stud assembly by a removable screw.

8. The optical wire assembly of claim 1, wherein said stud assembly further comprises a stud to reversibly mount to said external ground.

9. The optical wire assembly of claim 1, wherein said grounding base further comprises a groove for a cable extending in substantially the same direction as the groove in the cable clamp.

10. An external shield connector, comprising:
    a cable clamp defining a groove for a cable and two laterally spaced tabs, said tabs having longitudinally spaced opposite edges and having teeth disposed on the edges;
    a grounding base having a first surface, a cradle extending from said first surface to a second surface, two longitudinal slots extending from said first surface to said second surface to accommodate said tabs, a plurality of retaining clips in each slot at opposite longitudinal ends, and a grounding slot extending longitudinally from said cradle to an outer longitudinal end of said grounding base between said first and second surfaces; and
    an electrically conductive assembly mounted in said cradle having prongs extending away from said first surface and a stud assembly in electrical communication with said prongs and extending through said grounding slot to an external ground;
    wherein said cable clamp and said grounding base are fixed to each other on a received cable by said teeth irreversibly engaging said retaining clips.

11. The external shield connector of claim 10, wherein said prongs comprise an array of two pairs of laterally spaced prongs and two pairs of longitudinally spaced prongs.

12. The external shield connector of claim 11, wherein said longitudinal prongs extend a greater distance than said lateral prongs from said first surface.

13. The external shield connector of claim 11, wherein said longitudinally spaced prongs are spaced further apart than said laterally spaced prongs.

14. The external shield connector of claim 10, further comprising a rubber pad disposed between said conductive assembly and a rigid portion of said grounding base.

15. The external shield connector of claim 10, wherein said array of prongs is mounted to said stud assembly by a removable screw.

16. The external shield connector of claim 10, wherein said stud assembly further comprises a stud to reversibly connect to said ground.

17. The external shield connector of claim 10, wherein said grounding base further comprises a groove for a cable and the groove of the ground base and the groove in the cable clamp extend in a generally common direction upon mounting to a fiber optic cable.

\* \* \* \* \*